US008860675B2

(12) United States Patent
Wang et al.

(10) Patent No.: US 8,860,675 B2
(45) Date of Patent: Oct. 14, 2014

(54) DRAWING AID SYSTEM FOR MULTI-TOUCH DEVICES

(75) Inventors: Tao Wang, Shanghai (CN);
Hans-Frederick Brown, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 430 days.

(21) Appl. No.: 13/181,242

(22) Filed: Jul. 12, 2011

(65) Prior Publication Data

US 2013/0016126 A1    Jan. 17, 2013

(51) Int. Cl.

| G06F 3/041 | (2006.01) |
|---|---|
| G09G 5/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/048 | (2013.01) |
| G06F 3/033 | (2013.01) |

(52) U.S. Cl.
CPC ............. *G06F 3/041* (2013.01); *Y10S 715/964* (2013.01)
USPC ........... 345/173; 345/156; 715/964; 715/211; 715/863; 715/773

(58) Field of Classification Search
USPC ........................... 715/700–866; 345/173–178
See application file for complete search history.

(56) References Cited

U.S. PATENT DOCUMENTS

| 5,490,241 A | 2/1996 | Mallgren et al. |
|---|---|---|
| 6,057,845 A | 5/2000 | Dupouy |
| 7,465,230 B2 | 12/2008 | LeMay et al. |
| 7,489,306 B2 | 2/2009 | Kolmykov-Zotov et al. |
| 7,696,998 B2 | 4/2010 | Bae |
| 2004/0001060 A1 | 1/2004 | Stollnitz et al. |
| 2005/0162402 A1 | 7/2005 | Watanachote |
| 2005/0233799 A1 | 10/2005 | LeMay et al. |
| 2006/0001650 A1* | 1/2006 | Robbins et al. ............... 345/173 |
| 2006/0132460 A1 | 6/2006 | Kolmykov-Zotov et al. |

(Continued)

FOREIGN PATENT DOCUMENTS

WO    2010/056427    5/2010

OTHER PUBLICATIONS

International Search Report for PCT Application No. PCT/US2012/046540 filed on Jul. 12, 2012.

(Continued)

*Primary Examiner* — Dwayne Bost
*Assistant Examiner* — Christopher Kohlman
(74) *Attorney, Agent, or Firm* — Gates & Cooper LLP

(57) ABSTRACT

A method, apparatus, system, and computer program product/article of manufacture provide the ability to enable and use a tool implement on a multi-touch device. The tool implements may be activated and deactivated using the borders of touch-sensitive region of a multi-touch device. The tool implement can be positioned in the display area (e.g., by dragging grips of the tool) and then used (in combination with a touch gesture to perform an operation. The tool implement may be a drawing aid tool that is used to remap a user's stroke gesture to a defined stroke that is displayed.

30 Claims, 16 Drawing Sheets

(56) References Cited

U.S. PATENT DOCUMENTS

| | | | |
|---|---|---|---|
| 2008/0036773 A1 | 2/2008 | Bae | |
| 2008/0165140 A1 | 7/2008 | Christie et al. | |
| 2008/0180410 A1* | 7/2008 | McCall et al. | 345/179 |
| 2009/0021475 A1 | 1/2009 | Steinle et al. | |
| 2009/0199130 A1 | 8/2009 | Tsern et al. | |
| 2010/0001962 A1 | 1/2010 | Doray et al. | |
| 2010/0083111 A1 | 4/2010 | de los Reyes | |
| 2010/0149211 A1 | 6/2010 | Tossing et al. | |
| 2010/0295796 A1 | 11/2010 | Roberts et al. | |
| 2011/0102464 A1 | 5/2011 | Godavari | |
| 2011/0164029 A1 | 7/2011 | King et al. | |
| 2011/0175821 A1* | 7/2011 | King | 345/173 |
| 2011/0209098 A1* | 8/2011 | Hinckley et al. | 715/863 |
| 2011/0296353 A1 | 12/2011 | Ahmed et al. | |
| 2012/0210261 A1* | 8/2012 | Sarnoff et al. | 715/765 |
| 2013/0127910 A1* | 5/2013 | Tijssen et al. | 345/642 |

OTHER PUBLICATIONS

Blanke et al., "TOM a Multi-touch System for Learning Math", http://www.fh-trier.de/fileadmin/groups/12/Personen/Professoren/Schneider/papers/TOMCameraReady.pdf, May 2011.

Jakulin et al., "Artificial Aesthetic Sense", http://www.stat.columbia.edu/~jakulin/ASSAI/, Jun. 25, 2010.

Kammer et al., "Towards a Formalization of Multi-touch Gestures", http://www.dfki.de/its2010/papers/pdf/fp198.pdf, Nov. 2010.

International Search Report for PCT Application No. PCT/US2012/021442 filed on Jan. 16, 2012.

International Search Report for PCT Application No. PCT/US2012/021446 filed on Jan. 16, 2012.

International Search Report for PCT Application No. PCT/US2012/021448 filed on Jan. 16, 2012.

Amazon Simple Queue Service, downloaded from Wikipedia, the free encyclopedia on Aug. 11, 2010. URL: http://en.wikipedia.org/wiki/Amazon_Simple_Queue_Service.

Nasri et al., "Taxonomy of interpolation constraints on recursive subdivision curves", The Visual Computer, 2002.

"CV Curve", http://www.kxcad.net/autodesk/3ds_max/Autodesk_3ds_Max_9_Reference_CV_Curve.html, Jul. 3, 2011.

Abbas, A.M., "A Subdivision Surface Interpolating Arbitrarily-Intersecting Network of Curves under Minimal Constraints", Computer Graphics International, Jun. 8-11, 2010, Singapore, SP11.

Biermann, H., "Sharp Features on Multiresolution Subdivision Surfaces", Proceedings Ninth Pacific Conference on Computer Graphics and Applications, Pacific Graphics, Oct. 16-18, 2001, pp. 140-149.

Levin, A., "Interpolating Nets of Curves by Smooth Subdivision Surfaces", Proceedings of SIGGRAPH 99, Computer Graphics Proceedings, Annual Conference Series, pp. 57-64, 1999.

Nasri, A., "Sketch-Based Subdivision Models", Eurographics Symposium on Sketch-Based Interfaces and Modeling—SBIM '09, vol. 1, p. 53, New York, New York, USA, 2009, ACM Press.

Schaefer, S., et al., "Lofting Curve Networks using Subdivision Surfaces", Eurographics Symposium on Geometry Processing (2004), pp. 103-114.

Schoning et al., "Using Mobile Phones to Spontaneously Authenticate and Interact with Multi-Touch Surfaces", http://www.mmi.ifi.lmu.de/pubdb/publications/pub/schoening2008PhoneFlash/schoening2008PhoneFlash.pdf, 2008.

* cited by examiner

DRAWING AID SYSTEM FOR MULTI-TOUCH DEVICES

BACKGROUND OF THE INVENTION

1. Field of the Invention

The present invention relates generally to drawing applications, and in particular, to a method, apparatus, and article of manufacture for specific geometric creation tools in a sketching/drawing application executing on a multi-touch input device.

2. Description of the Related Art

Manually drawing or sketching perfect lines, circles and concentric rays with a pencil/brush is nearly impossible. Consequently, drawing aid tools such as rulers, compass, and protractors have been invented. The mental model of these drawing tools is deeply ingrained across multiple cultures and children are exposed to them at an early age. However, prior art drawing applications executing on multi-touch devices fail to take advantage of such ingrained mental models and do not provide equivalent tools that can be executed in an easy or intuitive/similar manner to their manual counterparts. Further, none of the prior art multi-touch sketching or drawing applications provide a comprehensive drawing aid system that takes advantage of the multi-touch capability available across multiple mobile devices.

In some cases, specific creation tools (e.g., tools to create a line, circle, arc, rectangle, etc.) have been implemented. However, such tools are static modality tools or commands that are separated from the "sketching" experience and which are not well adapted to the advantage of multi touch input devices. More specifically, existing two-dimensional (2D) sketching applications:

1. Use single input device and modality to enforce drawing aids;
2. Use distinct tools/commands to draw perfect lines/circles/rays; and/or
3. Snap/increments do not interact with line overhang artifacts.

Accordingly, what is needed is a capability to simulate/use various well-known manual drawing tools with similar capabilities on a multi-touch device in an intuitive manner.

SUMMARY OF THE INVENTION

Embodiments of the invention introduce new multi-touch gestures and transient graphic helpers that mimic how real-life rules, compass, protractor, and other drawing tools behave and how these tools are used without disrupting the sketching activities.

Furthermore, embodiments of the invention introduce a "soft" tool activation/deactivation method that also mimics where/how these real life tools are usually organized and placed around the physical canvas. This new tool activation method, which consists of tracking multi-touch inputs traversing from the borders of the digital canvas, provides a drawing environment that flows naturally without enforcing rigid/precise versus free drawing/sketching modes.

By taking advantage of multi-touch, transient graphical affordances and digital paper concepts, these new drawing aid tools can furthermore be utilized with a greater freedom by dissociating the drawing aid tools position on the digital canvas and the pencil/brush activities on the digital canvas itself. In other words the digital drawing aids' direction/angle can be enforced anywhere on the digital canvas and the artist does not need to always position the drawing aid precisely where he wants that direction/angle to be applied to his next brush/pencil stroke.

In addition to the above, embodiments of the invention introduce two types of increment behaviors to further emulate/mimic real life drawing tools. In this regard, real life rulers, compasses and protractors are used to control precise increments like angles or distances. Such behavior is also needed on a digital canvas, by providing increment behaviors, embodiments of the invention enable precise input or overhang control for each brush/pencil stroke. The overhang control may be better suited for artistic sketching while the precise input may serve the needs of precise drawing/sketch workflows.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
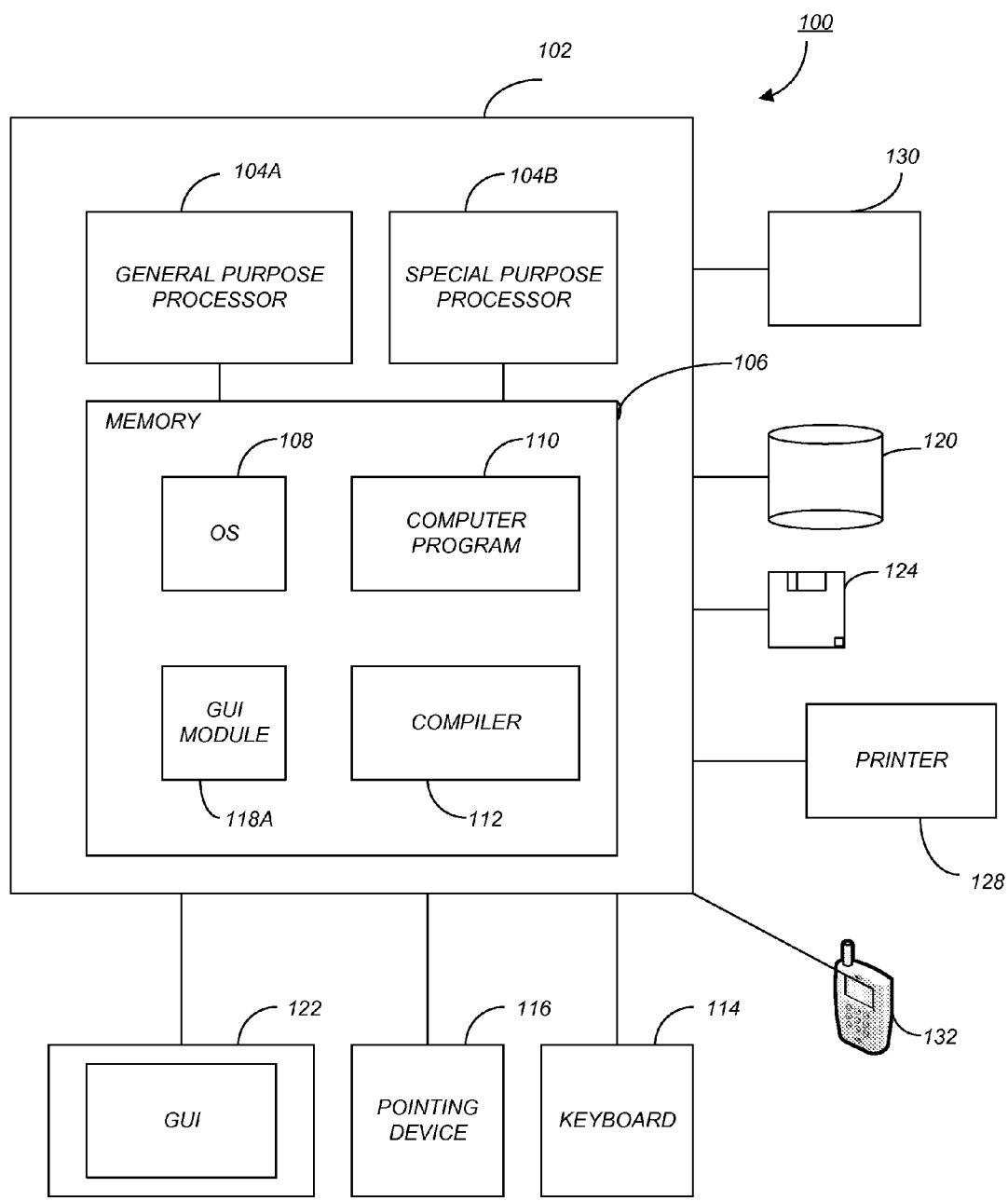
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a drawing aid system for multi-touch device in the form of a unique set of gesture and transient graphic manipulators that are closely related to their real life counterparts (e.g., ruler, compass and protractor). These drawing aid tools may always be available and can be easily activated and deactivated without the need of entering modes or running specific tools/commands.

Unique aspects of the embodiments of the invention may include one or more of the following:

1. The drawing add tools are activated and deactivated using the borders of the digital canvas and always available without having to change mode/command/tool;
2. Once the drawing aid tools are activated they influence the complete digital canvas space and are not specific to their current location/position;
3. The drawing aid tools can be controlled by one hand while the other hand is used to control the brush/pencil activities;
4. The different drawing aid tools can easily be swapped by a simple gesture; and
5. The drawing aid tools increment system can control differently how the captured stroke ends:
   a. With an overhand; or
   b. With a precise ending (e.g., snap like behavior).

Hardware Environment

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to integrated with other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to or may comprise a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors. In one or more embodiments, the display 122 is integrated with/into the computer 102 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
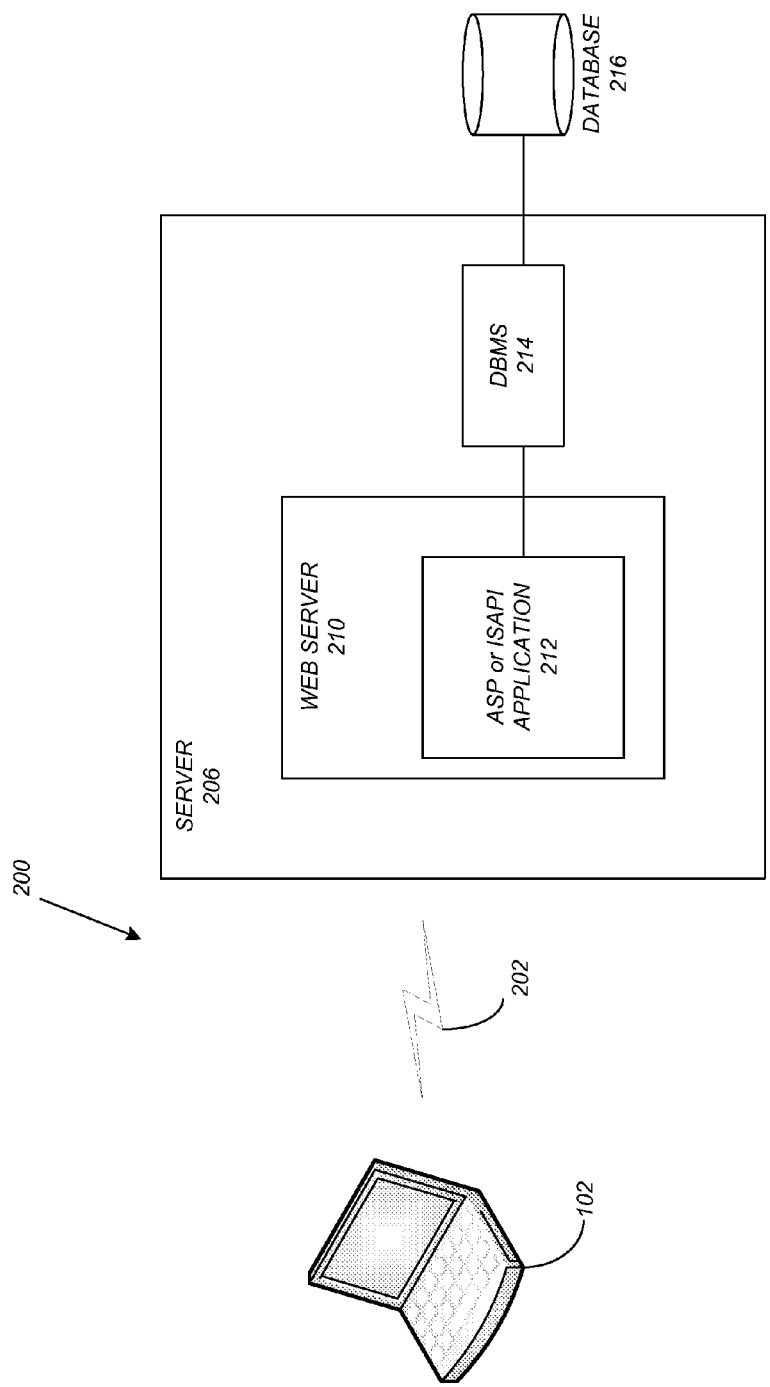
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, and/or any other device with suitable processing, communication, and input/output capability.

Of course, those skilled in the art will recognize that any combination of the above components, or any number of different components, peripherals, and other devices, may be used with computers 102 and 206.

Software Embodiment Overview

Embodiments of the invention are implemented as a software application on a client 102 or server computer 206. Further, as described above, the client 102 or server computer 206 may comprise a thin client device or a portable device that has a multi-touch-based display.

The multi-touch drawing aid concept is based around the idea of using real life-like drawing tools: ruler, compass and protractor to manipulate and control brush/pencil on a digital canvas. Just like in real life, these digital drawing aid tools can be utilized with both hands and can easily be summoned or discarded from the creative environment.

This premise serves to give the user access to a number of drawing tools, which can help create precise lines, circle, arcs and rays within the digital canvas without necessitating special commands or modes; thus keeping the artistic flow while the user moves from precise to freehand type strokes and vice versa.

Moving away from the constraints of the real life apparatus, these new drawing aid tools will be ubiquitous to the digital canvas and the user will not be forced to use them only from the tool's current position/location on the canvas.

The multi-touch drawing aid concept can be group in different functionality cluster that will be described in different sections below:

1. The drawing aid tools:
i) Ruler;
ii) Compass; and
iii) Protractor;
2. Summoning/activating of the drawing aid tools;
3. Dismissing/deactivation of the drawing aid tools;
4. Increment capturing;
5. Different increment modes and relation with the captured stroke; and
6. Cycling between the difference drawing aid tools.

Drawing Aid Tools

Embodiments of the invention may enable various different drawing aid tools. The tools all have the same basic representations and share similar interaction patterns. Each representation has two active position grips (see (B) in FIGS. 3-5). The user moves and adjusts the size/direction between these two graphic affordances to influence how the drawing aid influences the capture stroke.

Ruler

Figure 3:
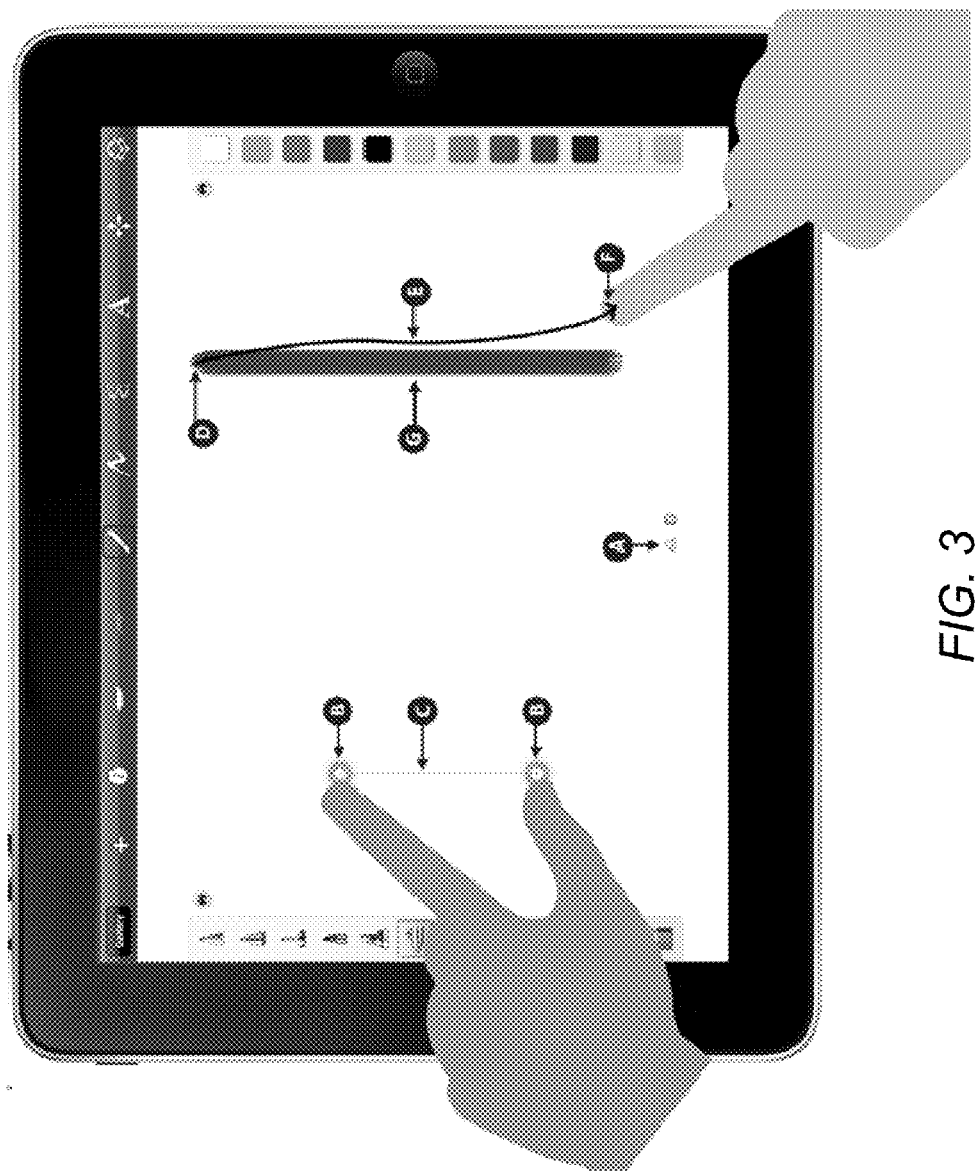
FIG. 3 is a visual representation of a ruler tool in accordance with one or more embodiments of the invention.

FIG. 3 is a visual representation of a ruler tool in accordance with one or more embodiments of the invention. In this example, the user has previously activated the ruler by pressing on the button (A). See the description below for gestures that activate the drawing aids without the usage of the button (A). The user can adjust the ruler's position by dragging the grips points (B) simultaneously. A line (C) between these two grips points (B) indicates the relationship between the grip points (B).

The user has not activated the increment on the ruler. Accordingly, the system is not showing any graphic affordances for increments. See description below for gestures that activate the increment system for the drawing aids.

Once the ruler is activated, the user inputs a first point (D), then the finger follows a wobbly path (E) and then the user lifts his finger (F). During the duration of that interaction, the system traces a straight line (G) that maps to the ruler's direction. Accordingly, the ruler drawing aid tool provides the ability to draw a straight line (G) anywhere on the drawing canvas that is parallel to the ruler's direction.

Compass

Figure 4:
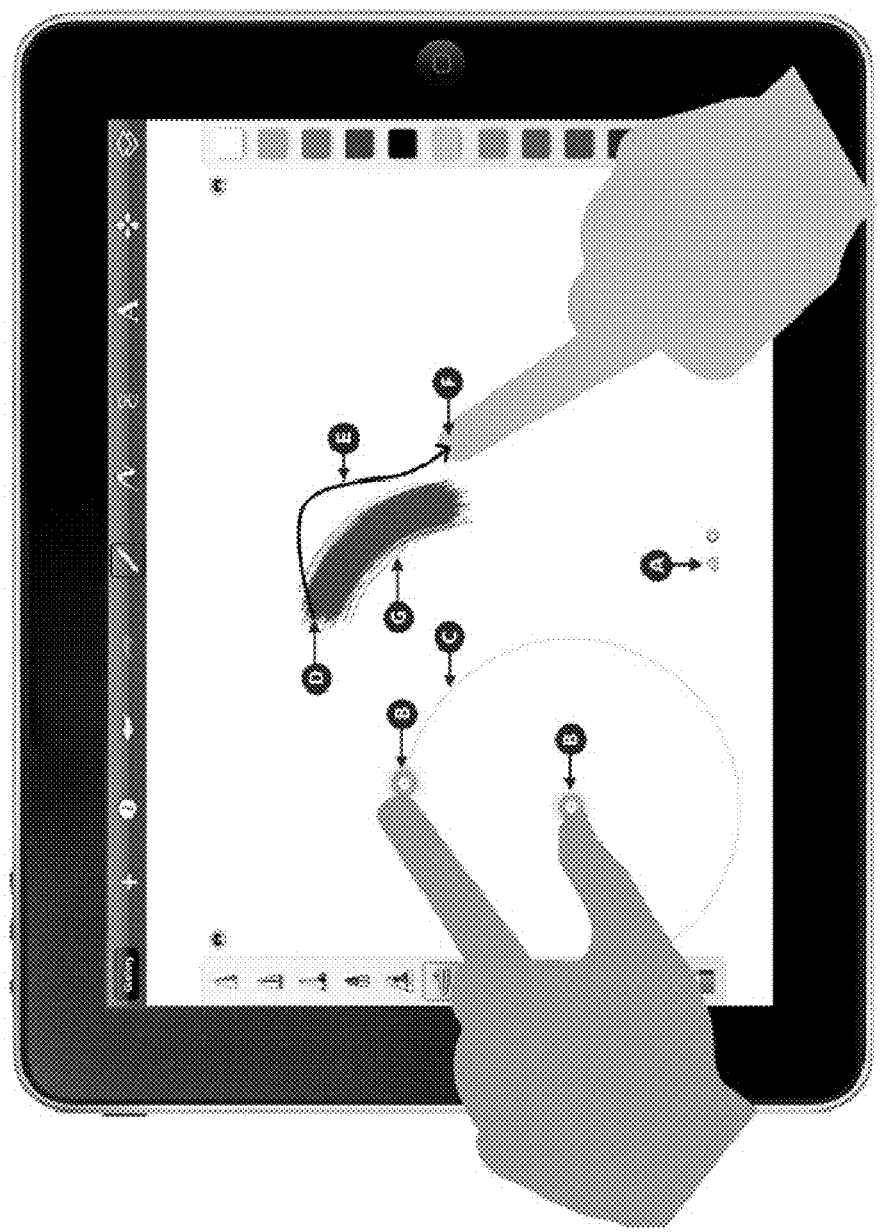
FIG. 4 is the visual representation for a compass tool in accordance with one or more embodiments of the invention.

FIG. 4 is the visual representation for a compass tool in accordance with one or more embodiments of the invention. In this example, the user has previously activated the compass by pressing on the button (A). See description below for gestures that activate the drawing aids without the usage of the button (A) and for the gesture(s) to cycle through the different drawing aid tools.

The user can adjust the compass' position by dragging the grips points (B) simultaneously. A circle (C) between these two grips points (B) indicates the relationship between the grip points (B).

The user has not activated the increment on the compass. Accordingly, the system in not showing any graphic affordances for them. See description below for gestures that activate the increment system for the drawing aids.

Once the compass tool is in use, the user inputs a first point (D) (e.g., using their other hand or the same hand if the tool is pinned to a particular display space). The finger then follows a wobbly path (E), and then the user lifts his finger (F). During the duration of the user's interaction, the system traces an arc line (G) that maps to the compass' direction. Accordingly, the compass drawing aid tool provides the ability for the user to draw an arc (G) that radiates on any circle having a center point that is coincident with the compass tool center point.

Protractor

Figure 5:
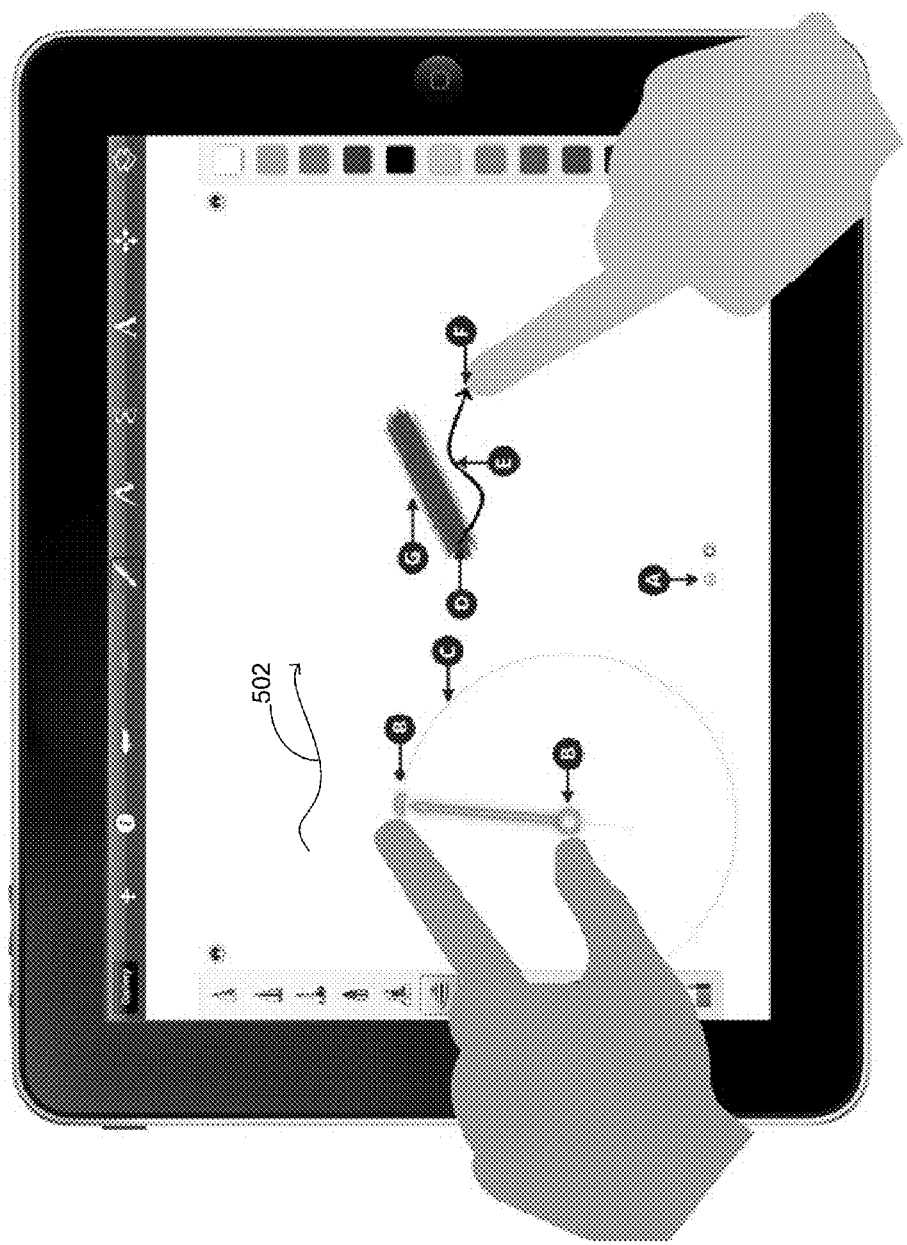
FIG. 5 is the visual representation for the protractor tool in accordance with one or more embodiments of the invention.

FIG. 5 is the visual representation for the protractor tool in accordance with one or more embodiments of the invention. In this example, the user has previously activated the protractor by pressing on the button (A). See the description below for gestures that activate the drawing aids without the usage of the button (A) and for gesture(s) that cycle through the different drawing aid tools.

The user can adjust the protractor' position by dragging the grips points (B) simultaneously. A ray and circle (C) between these two grips points (B) indicates the relationship between the grip points (B).

The user has not activated the increment on the protractor. Accordingly, the system in not showing any graphic affordances for them. See the description below for gestures that activate the increment system for the drawing aids.

Once the protractor has been activated, the user inputs (e.g., using a different hand or the same hand if the protractor tool has been positioned and the user has removed fingers from grip points (B)), a first point (D) then the finger follows a wobbly path (E) and then the user lifts his finger (F). During the duration of the interaction, the system traces a ray (G) that maps and projects from the center grip point (D). Accordingly, the protractor drawing aid tool provides the ability for the user to draw a straight line (G) that is coincident with any line that radiates outwards from the center point of the protractor.

Additional Drawing Aid Tools

Embodiments of the invention are not limited to the ruler, protractor, and compass tools described above. In addition, any other tool that shares the same basic representation and similar interaction patterns may be used. For example, a French curve tool may also be used. Such a tool is a template having many curves that are used to smooth curves of varying radii. A French curve is placed on the drawing canvas, and a pencil, knife, or other implement is traced around its curves to produce the desired result. The same basic representation consisting of two points may be used to orient the French curve and the other hand may be used to draw lines consistent with the curve. Alternatively, other drawing aid tools may be used.

Inconsistent Gesture Resolution

Embodiments of the invention may also provide the ability to resolve gestures that are inconsistent with the intended use of a particular tool. For example, if a ruler tool is used, and the drawing brush stroke is in a direction perpendicular/orthogonal to the ruler direction, embodiments of the invention are configured to resolve any discrepancies. In this regard, embodiments may attempt to automatically remap the user's gesture to a stroke that makes logical sense and in a manner that remains consistent with both the tool and the gesture.

As an example, referring to FIG. 3, if the ruler tool is used and the user gestures a stroke (F) that is within a threshold angle of the direction of the ruler, the entire stroke (F) may be remapped such that it is parallel (G) to the ruler. However, if the angle of the user's gesture is beyond a threshold value (e.g., more than 30 degrees, 45 degrees, 60 degrees, etc.), the gesture stroke (F) may still be remapped but instead of displaying the entire stroke, only a single point/dot may be drawn at the point of intersection between a line parallel to the tool and the gesture stroke (F) itself.

Referring to FIG. 4, in the example of a compass, the user may not draw an arc gesture (E) but instead may draw a straight line or an arc that is curved in the opposite direction (e.g., concave v. convex). In such an example, embodiments of the invention may remap the gesture (E) using the first point (D) as the start of the arc. Using the tool as a guide, embodiments of the invention may then attempt to map the final arc point (F) to a nearest point on an arc that is coincident with the circle on which point (D) lies. Accordingly, the arc gesture (E) is remapped to brush stroke (G) based on the closest point lying on a coincident arc.

Referring to FIG. 5, in the example of a protractor, the user may not draw a line that is within a threshold distance from a center point or may draw a straight line that is perpendicular to a radiating line and in a different location on the canvas (e.g., line 502). In such an example, embodiments of the invention may utilize the starting point of line 502 as input, utilize the center of the protractor, and after the last point of gesture 502 is received, remap the gesture 502 to a new line that is consistent with the tool use (e.g., to line (G) or to another line having the start point at the beginning of the gesture and a remapped ending point that is a closest point coincident with a line projecting from the center of the protractor (or some other remapping)). Thus, the new remapped line that is rendered may simply comprise a single dot or a line of a modified length that is consistent with the activated tool.

Multi-Touch Gesture to Summon/Activate the Drawing Aid Tools

Figure 6:
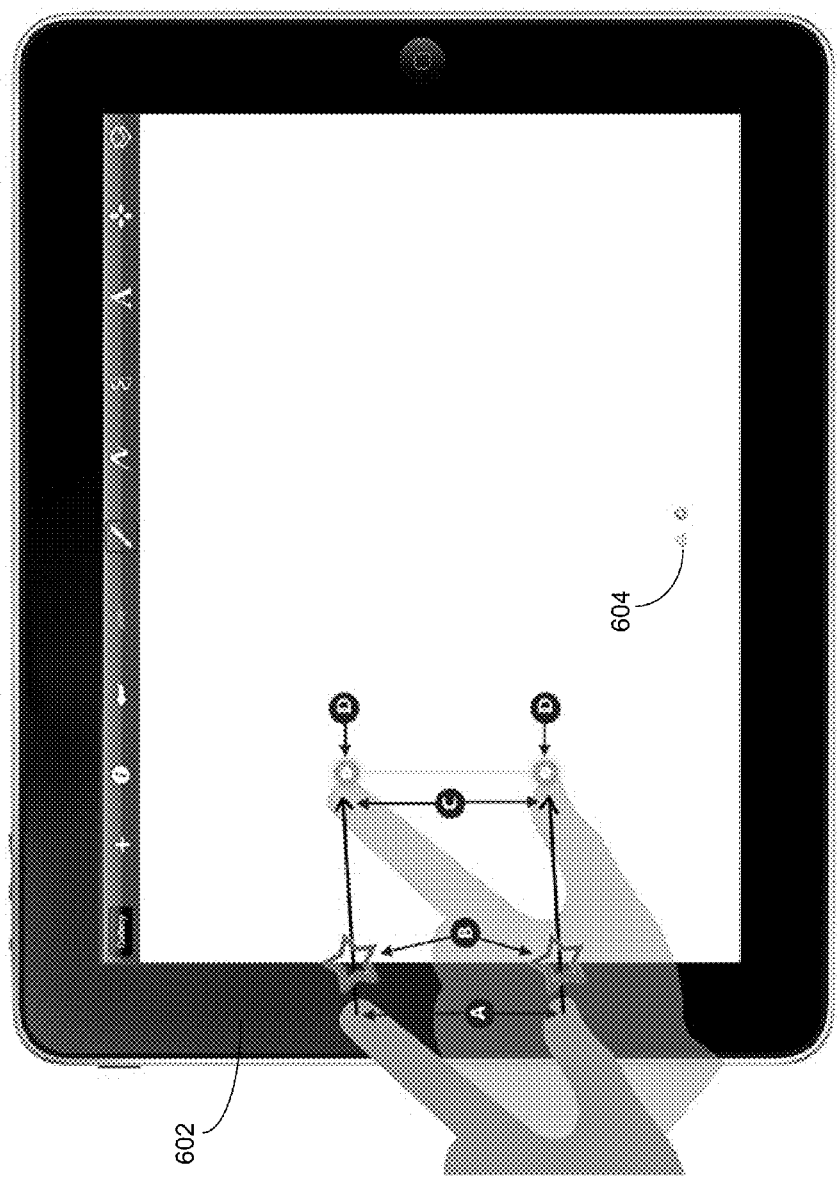
FIG. 6 illustrates the activation of a drawing aid tool using a multi-touch gesture in accordance with one or more embodiments of the invention.

The drawing aid tools can be activated by a multi-touch gesture without having to leave the current tool or drawing commands. FIG. 6 illustrates the activation of a drawing aid tool using a multi-touch gesture in accordance with one or more embodiments of the invention. The idea is based on the real world where artists keep their tools accessible in the proximity of the physical canvas. The border of the mobile device 602 becomes a virtual holding space for all the drawing aid tools.

To active any of the tools, the user simply starts a two finger hold position outside of the virtual canvas (A) and enters the canvas with the two fingers from any of the borders (B). The system detects two incoming touch events from any of the borders (left, right, top, bottom) and displays the last activated drawing aid (e.g., the ruler in FIG. 6). The drawing aid will display as soon has the system detects this situation and then the newly displayed drawing aid will follow the movement of the fingers.

The user can then position the drawing aid onto the digital canvas. The drawing aid will reside where the user lifts his fingers (D). In other words, the interaction with the user actually drawing a stroke may occur in a location (on the drawing canvas) other than where the tool is located on the drawing canvas; once the tool is positioned, the user can remove his/her hand/fingers (D) and still draw on the canvas in a separate location (e.g., with the other hand or the same hand). As explain above, the drawing aid can also be activated via a button 604 that is always visible in the middle lower position of the digital canvas. This button 604 acts like a toggle; it activates and de-activates the drawing aid tool.

In view of the above, the outside borders of a device are used as a virtual region to summon tools. Normally, devices are not active in such an outside region. Further, when a device normally detects two fingers touching, the device interprets the detection as a pan operation. Embodiments of the invention overwrite/substitute such a panning operation interpretation (e.g., by defining a new application programming interface [API]) that enables the detection of events from the outside region. Accordingly, if two input points are a certain distance apart and/or two different touch points are detected within a certain delay/time frame, such an action is interpreted as a tool summoning operation. Stated another way, if a touch input is detected from a border, the system may wait a certain amount of time (e.g., a threshold time of ⅛ sec., ½ sec., etc.) to determine if another touch input is received. If the second touch is detected within the time limit, the system may interpret such an operation as a tool summoning operation.

Embodiments of the invention may also limit such an interpretation based on a distance between the two touch points. For example, in one embodiment, the two touches must be received from the same or adjacent borders (e.g., both on the top, or on the top and right, top and left, etc.) (e.g., and not opposite sides). In another embodiment (e.g., a device with a smaller drawing canvas such as on an iPod™ Touch™), the distance between the two touch points may be used or the location of the touch points may not be used at all.

Multi-Touch Gesture to Dismiss/Deactivate the Drawing Aid Tools

The drawing aid tools can be deactivated by a multi-touch gestures without having to leave the current tool or drawing commands. Two different gestures may be used to dismiss the drawing aid tool.

Dragging Out Gesture

Figure 7:
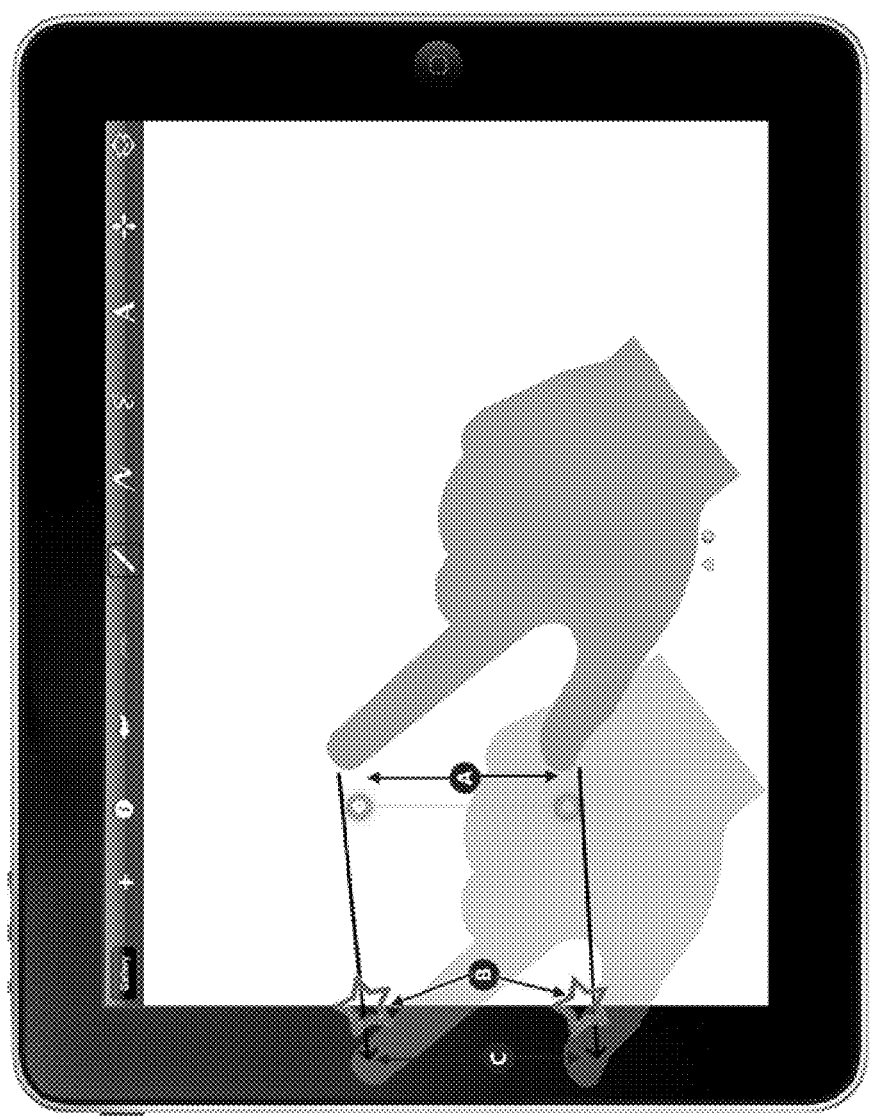
FIG. 7 illustrates a gesture of dragging out a tool to a device's border region to dismiss a drawing tool in accordance with one or more embodiments of the invention.

FIG. 7 illustrates a gesture of dragging out a tool to a device's border region to dismiss a drawing tool in accordance with one or more embodiments of the invention. The drawing aid is dismissed or disabled by simply dragging it outside of the canvas in any of the border directions.

To deactivate any of the tools the user simply start a two finger hold on the drawing aid position grips (A) and drags them out of the canvas with the two fingers to any of the borders (B). The system will detect two outgoing (disappearing) touch events from any of the borders (left, right, top, bottom) and will stop displaying the last drawing aid (e.g., the ruler in FIG. 7). The drawing aid will stop displaying as soon as the system detects this situation.

As described above, the drawing aid can also be deactivated via a button 604 that is always visible in the middle lower position of the digital canvas. This button acts like a toggle; it activates and de-activates the drawing aid tool.

"Implosion" Dragging Gesture

Figure 8:
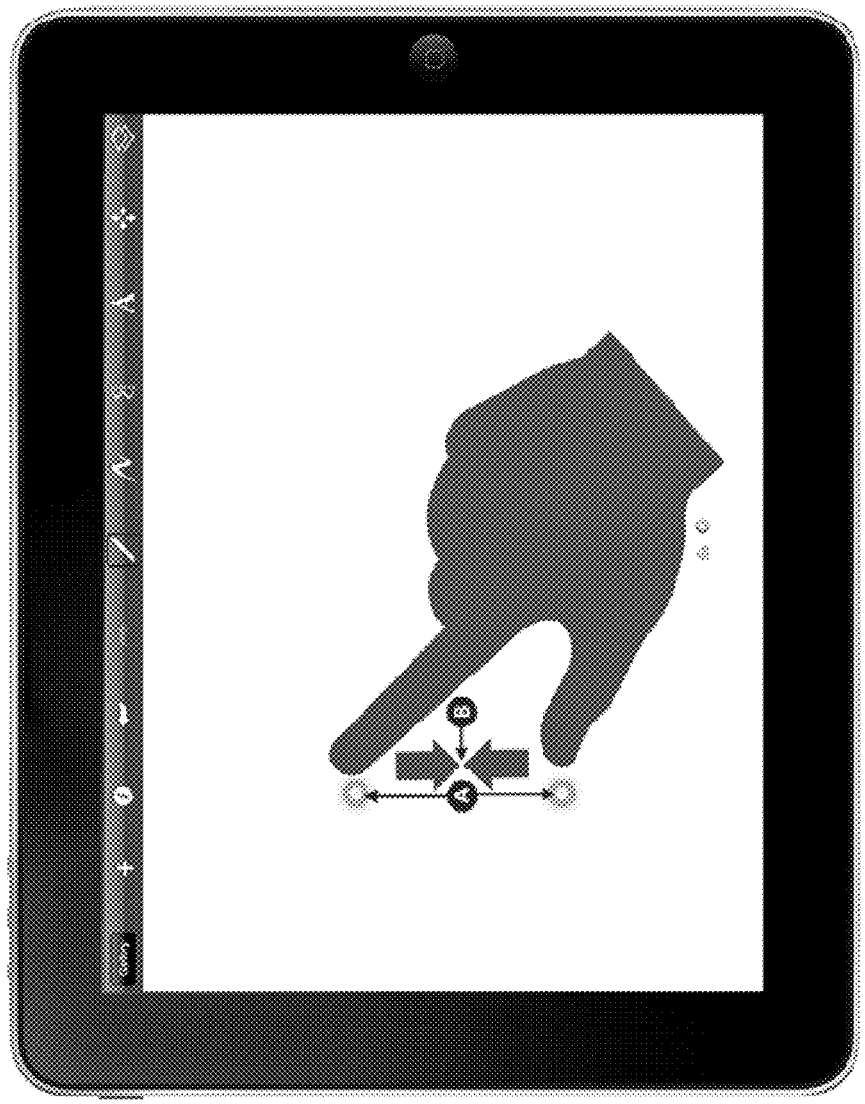
FIG. 8 illustrates a gesture of "implosion" dragging/pinching grips to dismiss a drawing tool in accordance with one or more embodiments of the invention.

FIG. 8 illustrates a gesture of "implosion" dragging/pinching grips to dismiss a drawing tool in accordance with one or more embodiments of the invention. The drawing aid is dismissed or disabled by simply dragging the two position grips toward the same "vortex" point. This is similar to a pinch but the gesture is originating from two/specific drawing grips/positions.

To deactivate any of the tools, the user simply starts a two finger hold on the drawing aid position grips (A) and drags the grips (A) towards each other/a converging point so that the points (A) collide (B). The system detects the two colliding (pinch) touch event and stops displaying the last drawing aid (e.g., the ruler in FIG. 8). The drawing aid will stop displaying as soon as the system detects this situation.

Resizing of Drawing Aid Tools

The drawing aid tools may be resized using a simple gesture. Similar to the "implosion" gesture to dismiss a drawing aid tool, a similar pinching gesture that stops short of converging on a single point may be used to shrink or decrease the size of a drawing aid tool (i.e., the length between the two grips (A) that are displayed.

In addition, an "exploding" gesture may be used to increase the size of a drawing aid tool. To increase the size, the user positions fingers on the two grips (A) and extends the fingers outwards from each other to the desired length of the ruler. Alternatively, a "flicking" type of motion in an outwards direction can be used to extend the distance between the grips (A) to the canvas boundary. In other words, the user can two-finger flick his/her fingers outward (in opposite directions from each other) subsequent to positioning on the grips (A) and the size/length of the drawing aid tool will extend to the boundary of the canvas. The boundary reached would depend on the angle/orientation of the drawing aid tool (e.g., top to bottom, side to side, side to top, top to side, corner to corner, etc.).

Extending the drawing aid tool in length/size may enable the user to more easily visualize the tool with respect to the canvas in order to orient/position the tool in a desired manner. Further, once a tool has been extended to a particular boundary, if the user elects to reorient the tool in a different direction (e.g., by rotating the tool), the endpoints of the tool may automatically extend/contract to the canvas boundary at the new orientation. Alternatively, the size of the original orientation prior to the rotation may remain intact. Such an automatic resizing may be presented as an option to the user (e.g., via a dialog box during/after a rotation or as a default setting).

In addition, it may be noted that the drawing aid tool is zoom independent such that if the user zooms in/out of the drawing canvas, the tool may remain the same size (e.g., as specified by the user). While a zoom operation may alter the number of increments in the tool, the tool itself may remain in the predefined/user defined size.

Multi-Touch Gestures to Enable Increment Capture for Drawing Aid Tools

The drawing aid enables the control of the precision and ending behavior of the brush stroke. The user can set a relative distance or angle for the drawing aid. Thereafter, each subsequent brush stroke is influenced by the prescribed distance or angle. See the description below for details regarding different increment modes and how these modes may affect the capturing of brush stroke events.

Insertion of a New Increment

Figure 9:
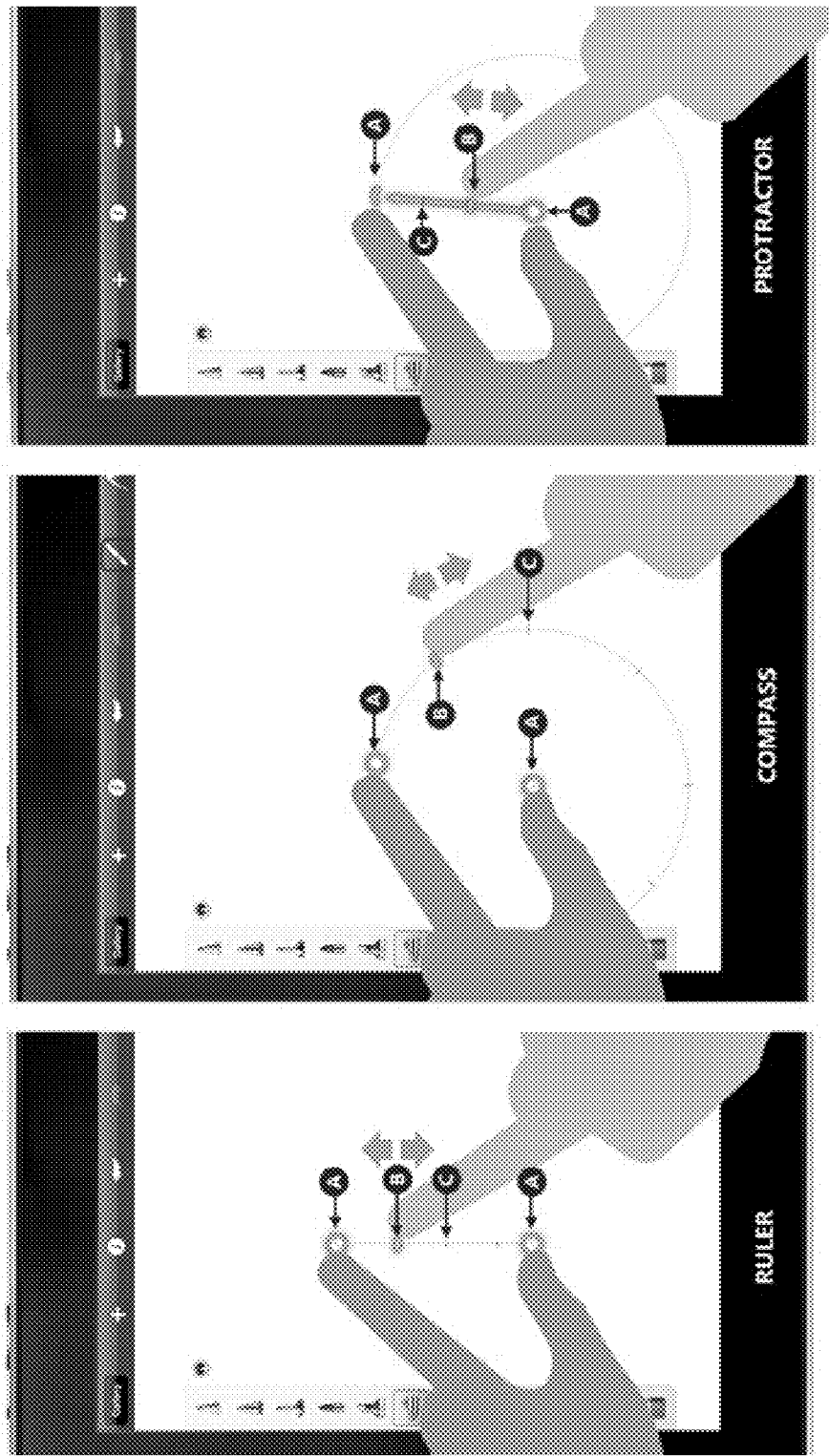
FIG. 9 illustrates the addition/adjustment of an increment in accordance with one or more embodiments of the invention.

The ruler, compass, and protractor may all share the same multi-touch interactions to add and adjust an increment. FIG. 9 illustrates the addition/adjustment of an increment in accordance with one or more embodiments of the invention.

To add an increment to any of the drawing aids, the user first activates the drawing aid by pressing on the two position grips (A). The user can then press anywhere on the line/ray that represents the relationship between the two positions grips (B) (e.g., with the other hand or with the same hand—three finger interactions). The system displays a new increment grip (B) at the specified location, and the user can drag the grip (B) along the line/arc to which it is constrained. The system also previews and displays the subsequent increments by repeating the same distance/angle on the line/ray between the two position grips (A). Accordingly, once an increment distance is established (i.e., the distance between a first point (A) and the increment (B)) the increment distance is used to display further increment lines. The increment distance is also used to determine the length/size of any stroke created using the drawing aid tool (as described in further detail below).

Accordingly, in FIGS. 9A, 9B, and 9C, the user is inserting/adjusting the increment in a ruler, compass, and protractor drawing aid tool respectively. To modify the position of the increment the user simply reactivates the two position grips (A) of any of the drawing aids and then drags an increment grip. While FIG. 9 displays the usage of two hands for these operations, some/all of these manipulations may be done using a single hand with three finger operations.

Deletion of an Increment

Figure 10:
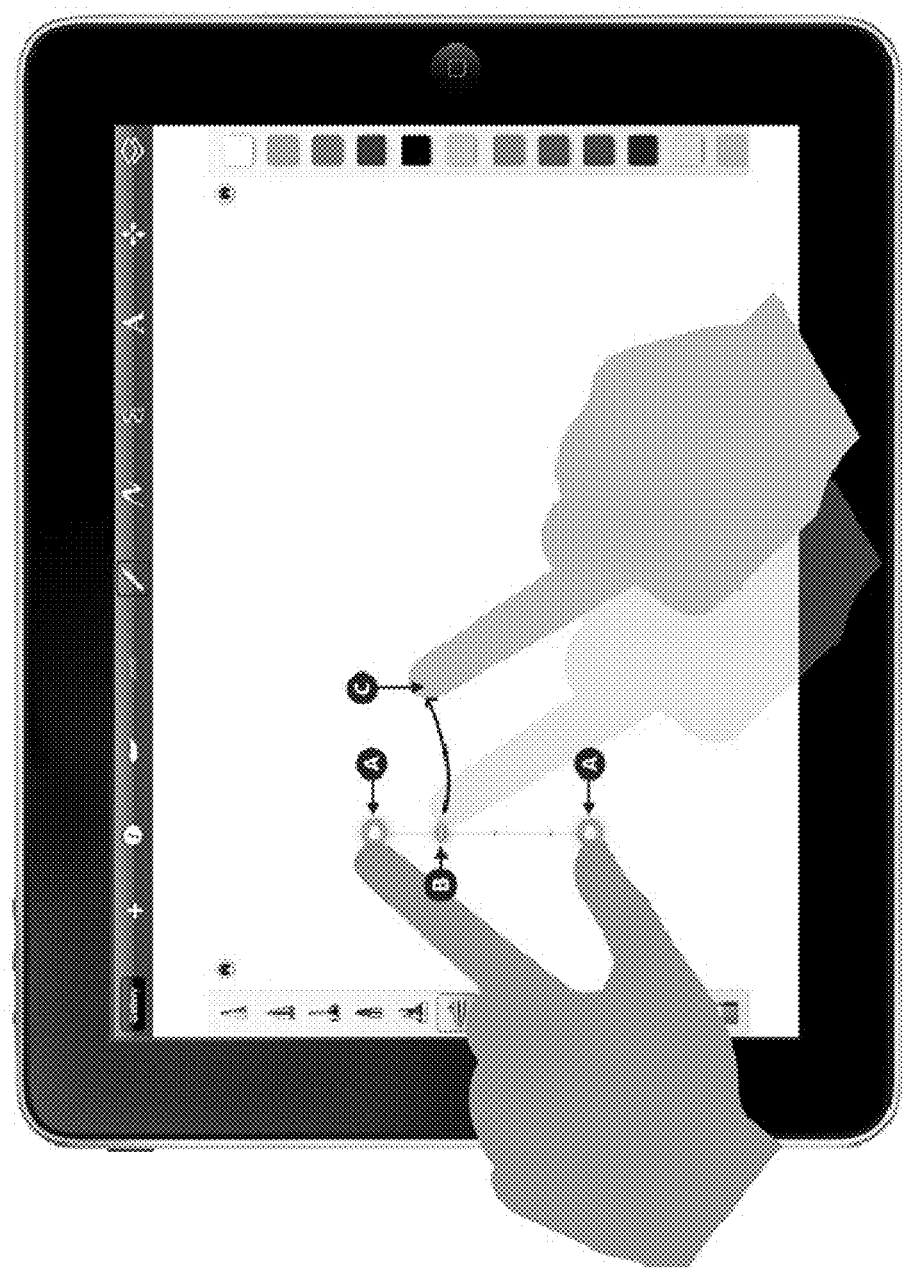
FIG. 10 illustrates the process for deleting an increment in accordance with one or more embodiments of the invention.

FIG. 10 illustrates the process for deleting an increment in accordance with one or more embodiments of the invention. The ruler, compass and protractor may all share the same multi-touch interactions to remove increments. To remove an increment of any of the drawing aids, the user must first activate the drawing aid by pressing on the two position grips (A) (e.g., a touch and hold gesture). The user can then press the increment (B) that is positioned anywhere on the line/ray. To remove/dismiss the increment, the user drags the increment out of the line/ray that represents the relationship between the two position grips (A). When the user lifts his finger and stops the dragging operation (C), the system removes the increments and stops displaying it.

Relation Between the Captured Stroke and the Increment Modes (Precise or Overhang)

The increment can control the captured brush strokes in two different ways. These increment modes are called "precise" and "overhang."

Precise Versus Overhang Mode

Figure 11:
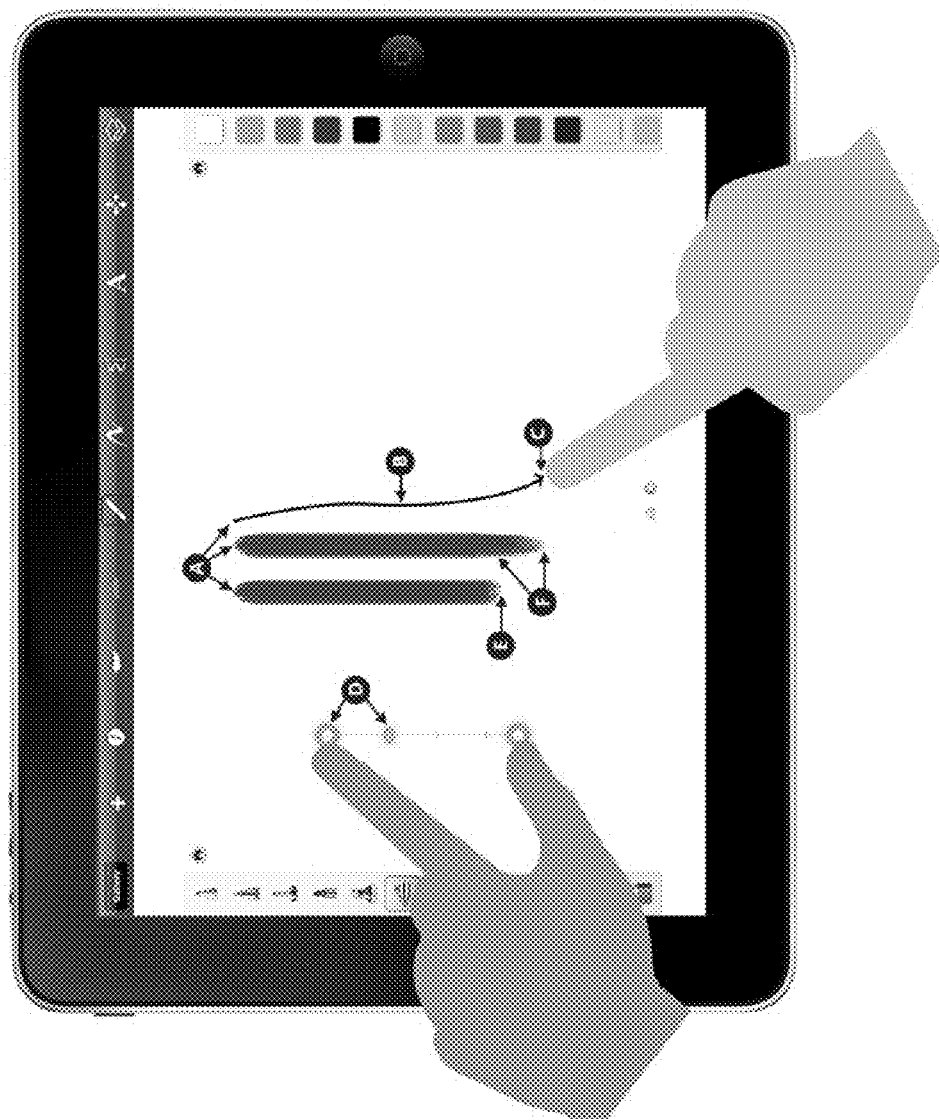
FIG. 11 illustrates how the precise and overhang modes affect the same brush stroke in accordance with one or more embodiments of the invention.

FIG. 11 illustrates how the precise and overhang modes affect the same brush stroke in accordance with one or more embodiments of the invention. In precise mode, represented by the (A) to (E) stroke, the captured stroke (B) is remapped to always finish in perfect increments value (D) from the original first point (A) hence the difference between the last input point (C) and the remapped finished point (E).

In overhang mode, represented by the (A) to (F) stroke, the captured stroke (B) is remapped to finish at the same points (e.g., see how (C) and (F) match). However, the distance from the last passed increment (E) is utilized to sample a pressure release effect—distance between (E) and (F).

These modes work with all the drawing aid tools (ruler, compass, and protractor). For example, in a compass, the increment may be a degree such that when the user draws an arc with his/her finger, the increment will be used to determine the length of the arc. Similar to a ruler, when using an increment with a protractor, the increment will determine the length of the displayed line. Alternatively, a specific line length may be established and all lines/arcs may automatically adjust to the specified length regardless of the size of the captured stroke (B).

In summary, when setting the increment (as described above), the distance (D) between a first grip and a point is used to determine the increment distance. To use the increment distance, when the user begins a stroke at point (A), the starting point is remapped to begin at point (A) and the increment distance (D) is used thereafter.

The resulting length of the remapped stroke (E) or (F) depends on whether the user has selected the precise versus overhang mode. In precise mode, the last point of the captured stroke (C) is remapped to a specific and exact increment value (D) (i.e., there is a hard stop or a snap to point (E) based on an exact increment value (D)). Embodiments of the invention can remap the captured last point (C) to a particular increment based on a variety of methods. For example, in one embodiment, the point (C) is always remapped to the prior increment (e.g., similar to a round-down operation). Alternative embodiments may select the nearest increment, round up to the next increment. In yet another embodiment, the system may attempt to determine when the point (C) is within a certain threshold of a particular increment point and based the "snapping" or length of the displayed stroke to a particular increment based on the point within the threshold region. Embodiments of the invention may also provide the ability for the user to select how the system remaps to a particular increment and/or whether to use the increment at all.

In the overhang mode, a fade/pressure release affect may be used based on the delta/distance between the prior increment value and the point of release (C).

Multi-Touch Gesture to Change Increment Mode

Figure 12:
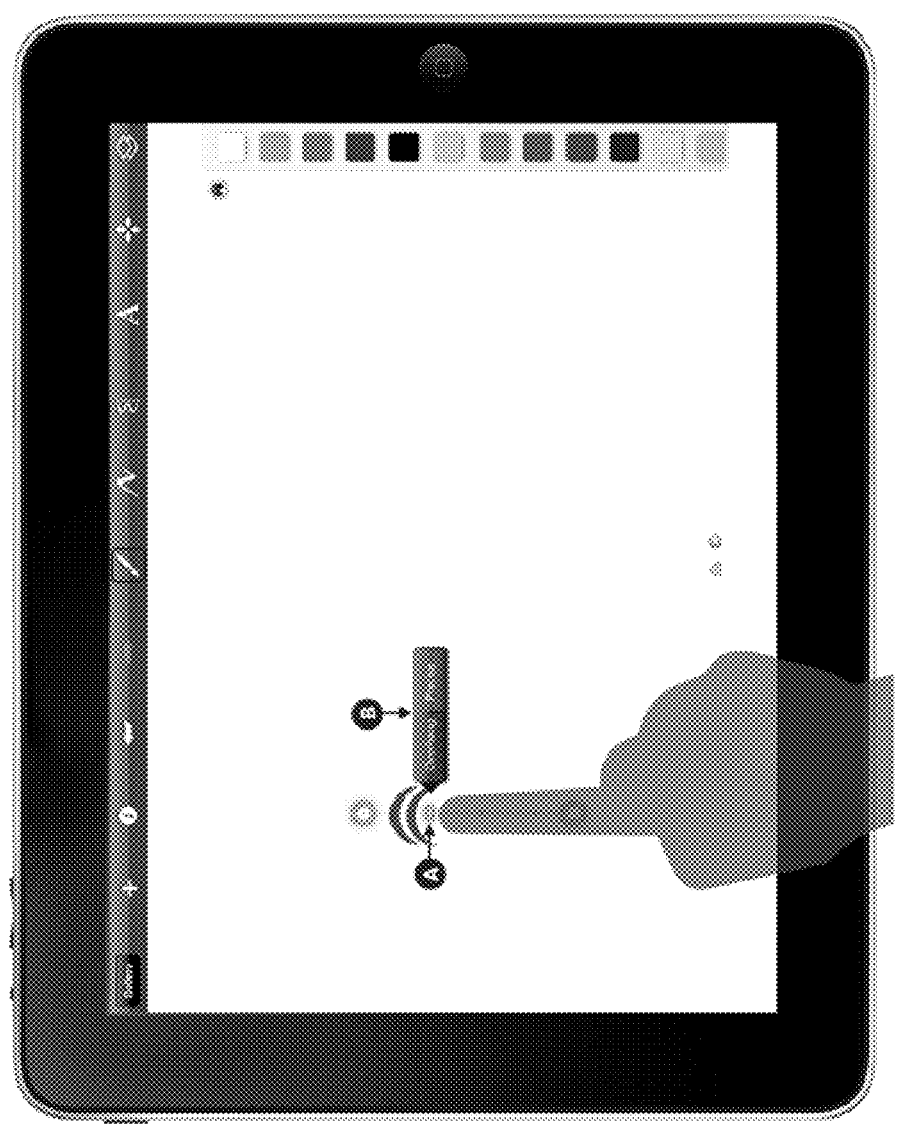
FIG. 12 illustrates a gesture used to change the increment mode in accordance with one or more embodiments of the invention.

FIG. 12 illustrates a gesture used to change the increment mode in accordance with one or more embodiments of the invention. The user simply needs to double tap on the increment grip (A) and the increment mode selector (B) will be displayed by the system. The default setting for the increment mode may be "Overhang." The user can also tap and hold on the increment grip and then the increment mode selector (B) will be displayed. Thereafter, the user can simply select the desired increment mode.

Multi-Touch Gesture to Enable Cycling in the Drawing Aid Tools

The user can cycle and choose the different drawing aid tools by using two different approaches. The first method is available when any of the drawing aid tools is activated and the second method is available via the button that is always visible in the middle lower position of the digital canvas.

Cycling when Drawing Tool Activated

Figure 13:
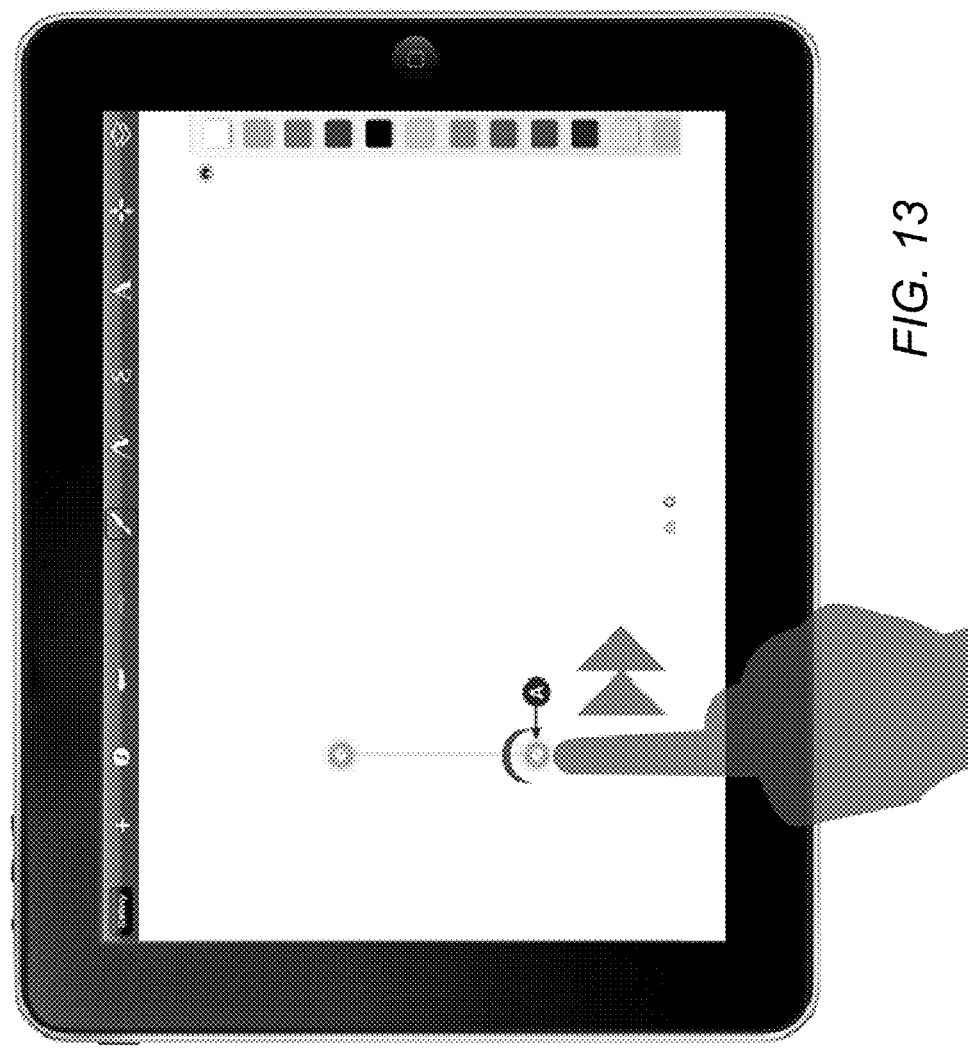
FIG. 13 illustrates the ability to cycle through the different drawing aid tools when a drawing tool is already activated in accordance with one or more embodiments of the invention.

FIG. 13 illustrates the ability to cycle through the different drawing aid tools when a drawing tool is already activated in accordance with one or more embodiments of the invention. The user simply needs to tap on any of the displayed position grips (A) of the drawing aid tools to cycle to the next available tool. Each time the user taps a grip (A), the next drawing tools is displayed and the originated position grip stays as the reference pivot point for the compass and protractor tools.

The drawing aid tools cycle from the ruler (default) to the compass and finally to the protractor, then cycles again in the same order. Alternative cycle orders may also be used.

Cycling Using the Button

Figure 14:
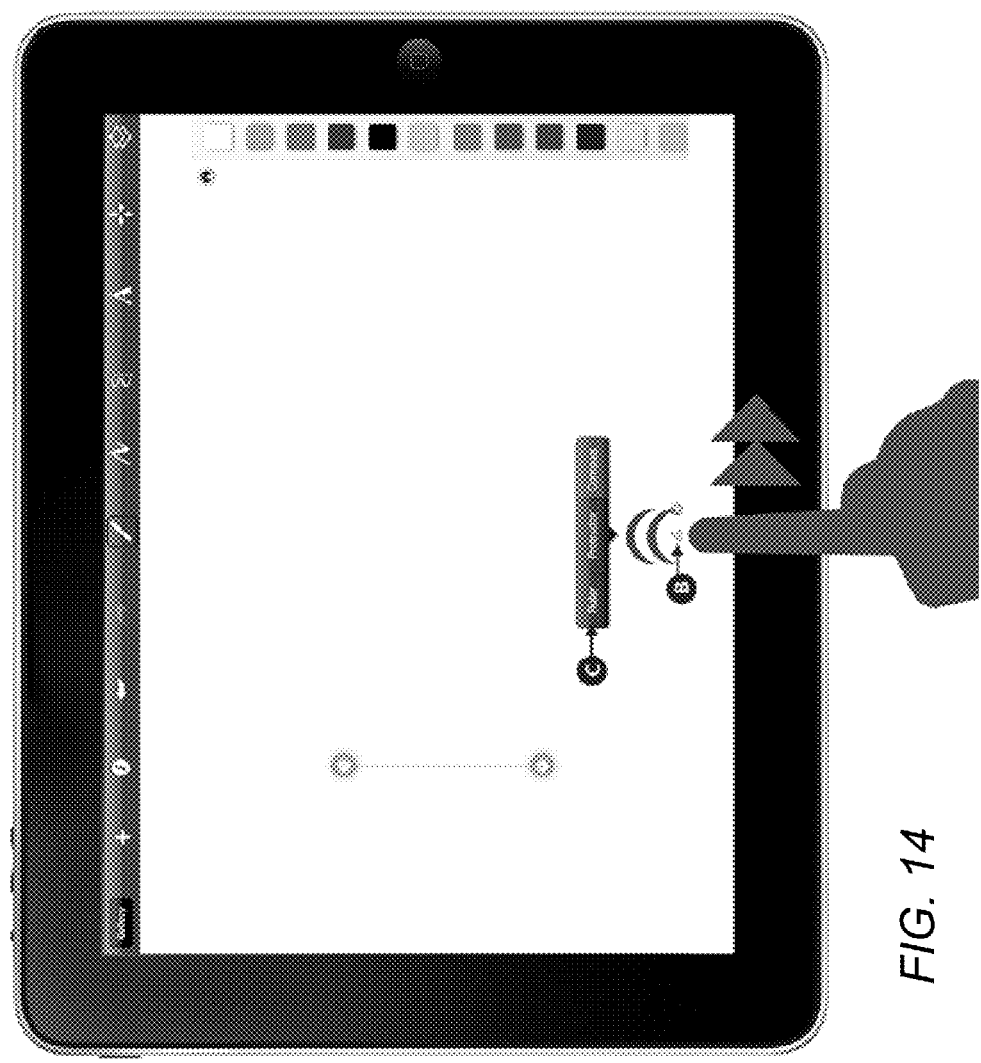
FIG. 14 illustrates the ability to cycle through the different drawing aid tools using a grip button in accordance with one or more embodiments of the invention.

FIG. 14 illustrates the ability to cycle through the different drawing aid tools using a grip button in accordance with one or more embodiments of the invention. The user simply needs to double tap on the button (B) and the active drawing tool will cycle to the next available tool. Each time the user double taps, the next drawing tools is displayed and the position grips stay as the same reference points for all the tools.

The drawing aid tool cycles from the ruler (default) to the compass and finally to the protractor, then cycles again in the same order (or any other order desired). The user can also tap and hold on the button to display a drawing aid tool selector (C). The user can select the desired drawing aid tool using the selector (C). These cycling methods are available either when a drawing tool is active or if deactivate/inactive. In the case were the drawing tool is deactivated, the change will take place when the drawing aid tool is activated the next time.

Logical Flow

Figure 15:
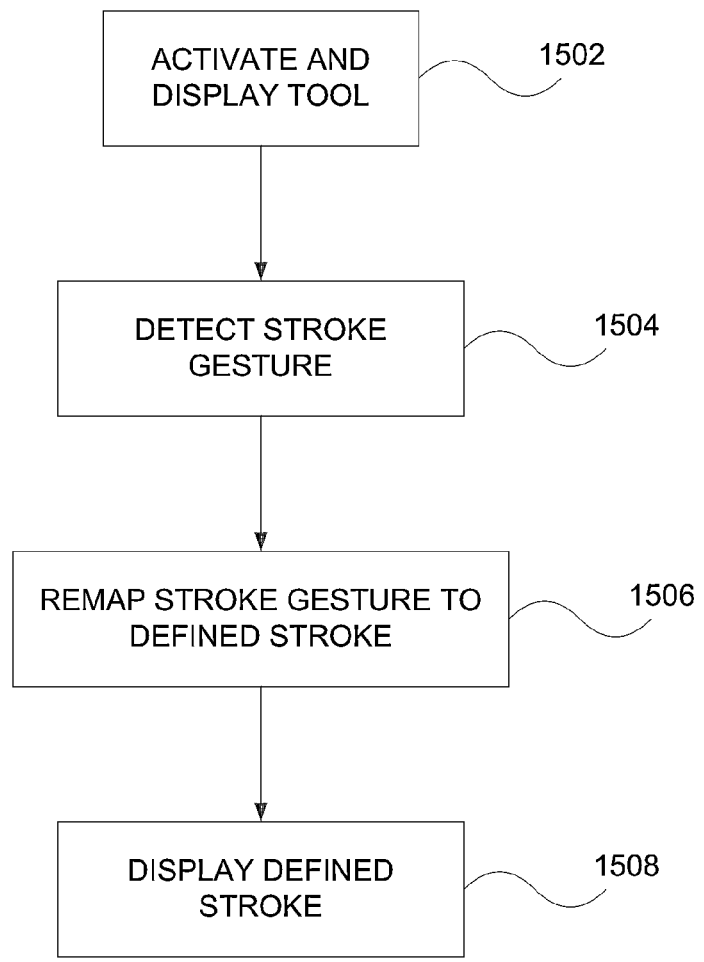
FIG. 15 illustrates the logical flow for using a drawing aid tool on a multi-touch device in accordance with one or more embodiments of the invention.

FIG. 15 illustrates the logical flow for using a drawing aid tool on a multi-touch device in accordance with one or more embodiments of the invention.

At step 1502, a drawing aid tool is activated and displayed. The drawing aid tool includes a first and second grip (located at first and second touches in a touch-sensitive region of the multi-touch device) and graphic representation of the tool. A relationship between the first grip and the second grip defines a size and orientation of the drawing aid tool that is displayed. The display of the tool may include positioning the tool by moving the two grips based on movement of the two touches/touch points.

At step 1504, a stroke gesture is detected in the multi-touch device.

At step 1506, the stroke gesture is remapped to a defined stroke using the drawing aid tool. The first touch and the second touch may be controlled by a first hand of a user (e.g., a thumb and pointer finger) while the stroke gesture is controlled by a second hand of the user (e.g., using an index finger).

At step 1508, the defined stroke is displayed. As noted above, the drawing aid tool influences a complete digital canvas space of the multi-touch device and the influence of the drawing aid tool is not specific to the location on the drawing canvas of drawing aid tool. The defined stroke is displayed dynamically in real time as the stroke gesture is detected. In other words, the system may not display the actual stroke gesture but only displays the remapped/defined stroke as the user is entering gestures on the multi-touch device.

As described above, the drawing aid tool may be a ruler with the grips located at the ends of the ruler and the graphic representation displays a ruler line connecting the two grips. Using a ruler drawing aid tool, when the stroke gesture is a curvilinear line, the tool is used to remap the curvilinear line to a new line that is parallel to the ruler line.

In another embodiment, the drawing aid tool may be a compass with one grip located at a center point of the compass and the second grip located on a circle where a radius of the circle is defined by a distance between the two grips. The graphic representation displays a circle having the first grip as the center point and the second grip located on the perimeter of the circle. Using the compass tool, when the stroke gesture is a curvilinear line, the tool is used to remap the curvilinear line to an arc line that is concentric with the circle.

In yet another embodiment, the drawing aid tool may be a protractor with the first grip located at a center point of the protractor and the second grip located on a circle (where the radius of the circle is defined by a distance between the first grip and the second grip). The graphic representation displays the circle having the first grip as the center point, the second grip located on the perimeter of the circle, and a ray between the first grip and the second grip. Using the protractor tool, when the stroke gesture is a curvilinear line, the tool is used to remap the curvilinear line to a ray that projects from the center point.

The user may easily and simply cycle through the different drawing aid tools simply by tapping on either tool grip.

As part of steps 1502-1508, increments may be used to control the length/angle of the defined stroke. In such an embodiment, a relative distance that is based on the second grip is set on the drawing aid tool. Increment lines that are based on the relative distance are then displayed on the tool. If a precise increment setting is used, the defined stroke has a precise defined length that is a multiple of the relative distance. However, if an overhand increment setting is used, a pressure release effect that is based on a finish distance between a last passed increment and an end of the stroke gesture is defined and used.

Figure 16:
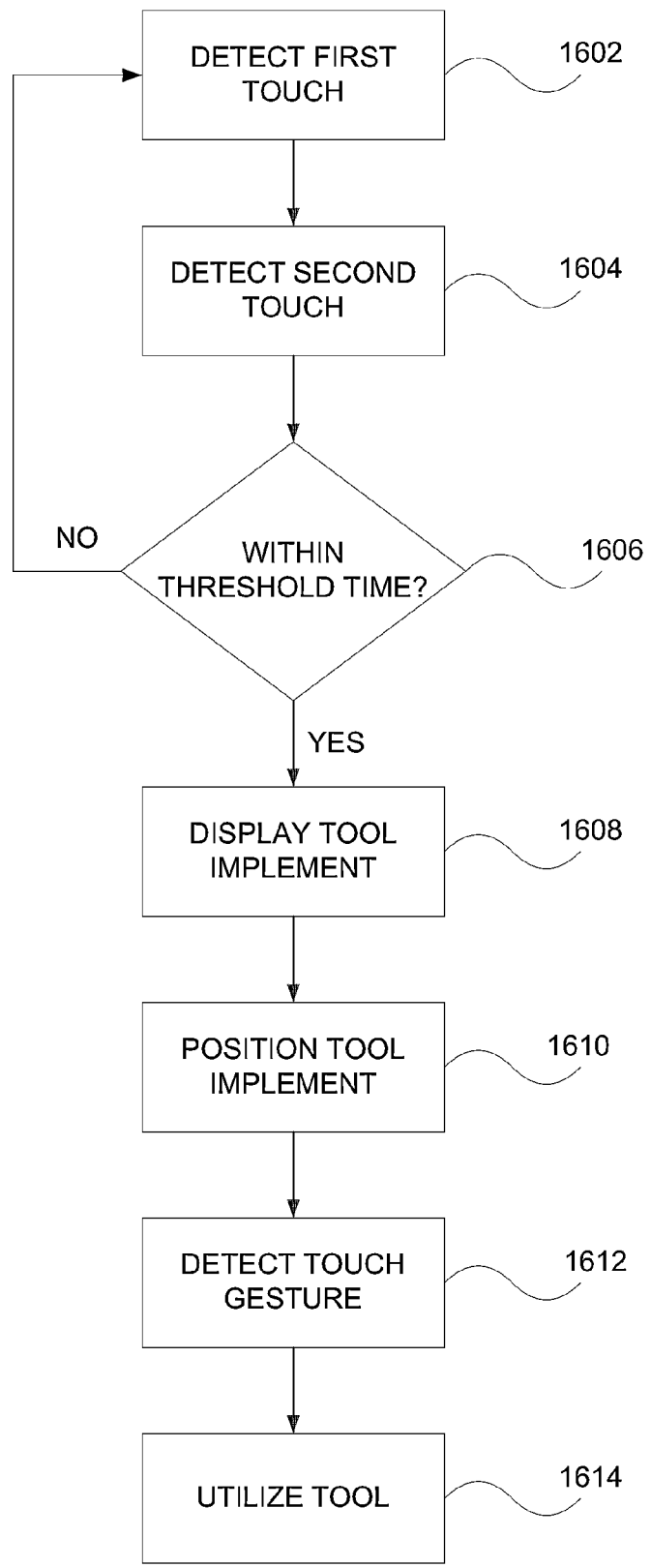
FIG. 16 is a flow chart illustrating the logical flow for enabling a tool implement (whether a drawing tool or otherwise) in accordance with one or more embodiments of the invention.

The activation and display of the tool at step 1502 may be performed in a variety of manners. FIG. 16 is a flow chart illustrating the logical flow for enabling a tool implement (whether a drawing tool or otherwise) in accordance with one or more embodiments of the invention.

At step 1602, a first touch at a border of a touch-sensitive region of the multi-touch device is detected.

At step 1604, a second touch at a border of a touch-sensitive region of the multi-touch device is detected.

At step 1606, a determination is made regarding whether the second touch is detected within a threshold time of the first touch.

If the second touch is received outside of the time threshold, the process repeats at step 1602. If the second touch is received within the time threshold, the tool implement is displayed at step 1608. The tool implement has a first grip at the first touch location, a second grip at the second touch location, and a graphic representation of the tool. In addition, a relationship between the two grips defines a size and orientation of the tool implement.

At step 1610, the tool implement is positioned based on movement of the two touches (e.g., by moving the two grips corresponding to movement of the two touches such as via user dragging their fingers across the touch-sensitive device).

At step 1612, a touch gesture is detected in the multi-touch device.

At step 1614, the tool implement is utilized in combination with the touch gesture to perform an operation in an application executing on the multi-touch device.

In one or more embodiments, the tool implement may be a drawing aid tool, the touch gesture is a stroke gesture, and the application is a computer drawing application. In such an embodiment, similar to that of FIG. 15, the utilization of the drawing aid tool includes remapping the stroke gesture to a defined stroke and displaying the defined stroke.

In addition to activating/enabling the tool implement, the tool may also be easily deactivated/disabled (e.g., as part of step 1614). To deactivate the tool, embodiments of the invention may detect a two-finger hold on the two grips followed by a dragging of the tool implement towards the border of the touch sensitive region (e.g., using the two grips). In response to detecting two outgoing touch events (of the two grips) from the border, the tool implement is deactivated and stops displaying (i.e., the display of the tool implement is withdrawn). Alternatively, in response to detecting a touch event on a tool implement toggle button, the tool implement may be deactivated and stop displaying. In yet another alternative embodiment, after detecting the two finger hold, the system may detect a dragging of the two grips towards a single point followed by a colliding touch event at the single. In response thereto, the tool implement may be deactivated and stop displaying.

CONCLUSION

This concludes the description of the preferred embodiment of the invention. The following describes some alternative embodiments for accomplishing the present invention. For example, any type of multi-touch device or computer, such as a mainframe, minicomputer, or personal computer, or computer configuration, such as a timesharing mainframe, local area network, or standalone personal computer, could be used with the present invention. In summary, embodiments of the invention provide a drawing aid system for multiple touch devices. More specifically, the drawing aid tools are activated and deactivated using the borders of the digital canvas and are always available without having to change the mode/command/tool. Once the drawing aid tools are activated, they influence the complete digital canvas space and are not specific to their current location/position. The drawing aid tools can be controlled by one hand while the other hand is used to control the brush/pencil activities. Further, the different drawing aid tools can easily be swapped by a simple gesture. In addition, the drawing aid tools increment system can control different how the captured stroke ends (e.g., with an overhand, or with a precise ending—snap like behavior).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for enabling a tool implement on a multi-touch device, comprising:
    (a) detecting a first touch at a border of a touch-sensitive region of the multi-touch device;
    (b) detecting a second touch at the border of the touch-sensitive region of the multi-touch device;
    (c) if the second touch is detected within a threshold time, displaying the tool implement, wherein the tool implement comprises:
        (i) a first grip located at the first touch;
        (ii) a second grip located at the second touch; and
        (iii) a graphic representation of the tool implement wherein a relationship between the first grip and the second grip defines a size and orientation of the tool implement;
    (d) detecting a tap gesture on the first grip or the second grip;
    (e) in response to the tap gesture, cycling to a different drawing aid tool;
    (f) positioning the tool implement based on movement of the first touch and the second touch, wherein the positioning comprises moving the first grip and the second grip corresponding to the movement of the first touch and the second touch;
    (g) detecting a touch gesture in the multi-touch device; and
    (h) utilizing the tool implement in combination with the touch gesture to perform an operation in an application executing on the multi-touch device.

2. The computer-implemented method of claim 1, wherein:
    the tool implement comprises a drawing aid tool;
    the touch gesture comprises a stroke gesture;
    the application comprises a computer drawing application; and
    the utilizing comprises remapping the stroke gesture to a defined stroke using the drawing aid tool and displaying the defined stroke.

3. The computer-implemented method of claim 1, further comprising:
    detecting a two-finger hold on the first grip and the second grip of the tool implement;
    dragging the tool implement towards the border of the touch sensitive region using the first grip and the second grip;
    detecting two outgoing touch events, of the first grip and the second grip, from the border; and
    in response to detecting the two outgoing touch events, deactivating and stop displaying the tool implement.

4. The computer-implemented method of claim 1, further comprising:
    detecting a touch event on a tool implement toggle button; and
    in response to the detecting of the touch event, deactivating and stop displaying the tool implement.

5. The computer-implemented method of claim 1, further comprising:
    detecting a two finger hold on the first grip and the second grip of the tool implement;
    detecting a dragging of the first grip and the second grip to a single point;
    detecting a colliding touch event of the first grip and the second grip at the single point; and
    in response to the detecting of the colliding touch event, deactivating and stop displaying the tool implement.

6. A computer-implemented method for drawing a stroke using a drawing aid tool on a multi-touch device, comprising:
    (a) activating and displaying a drawing aid tool, wherein the drawing aid tool comprises:
        (i) a first grip located at a first touch in a touch-sensitive region of the multi-touch device;
        (ii) a second grip located at a second touch in the touch-sensitive region of the multi-touch device; and
        (iii) a graphic representation of the tool wherein a relationship between the first grip and the second grip defines a size and orientation of the drawing aid tool;
    (b) detecting a tap gesture on the first grip or the second grip;
    (c) in response to the tap gesture, cycling to a different drawing aid tool;
    (d) detecting a stroke gesture in the multi-touch device;
    (e) remapping the stroke gesture to a defined stroke using the drawing aid tool; and
    (f) displaying the defined stroke.

7. The computer-implemented method of claim 6, further comprising:
    positioning the drawing aid tool based on movement of the first touch and the second touch, wherein the positioning comprises moving the first grip and the second grip corresponding to the movement of the first touch and the second touch.

8. The computer-implemented method of claim 6, wherein:
    the drawing aid tool influences a complete digital canvas space of the multi-touch device; and
    the influence of the drawing aid tool is not specific to a drawing aid tool location.

9. The computer-implemented method of claim 6, wherein:
the first touch and the second touch are controlled by a first hand of a user; and
the stroke gesture is controlled by a second hand of the user.

10. The computer-implemented method of claim 6, wherein:
the drawing aid tool comprises a ruler;
the first grip is located at a first end of the ruler;
the second grip is located at a second end of the ruler;
the graphic representation comprises a ruler line connecting the first grip and the second grip;
the stroke gesture comprises a curvilinear line; and
the remapping remaps the curvilinear line to a new line that is parallel to the ruler line.

11. The computer-implemented method of claim 6, wherein:
the drawing aid tool comprises a compass;
the first grip is located at a center point of the compass;
the second grip is located on a circle, wherein a radius of the circle is defined by a distance between the first grip and the second grip;
the graphic representation comprises the circle having the first grip as the center point and the second grip on a perimeter of the circle;
the stroke gesture comprises a curvilinear line; and
the remapping remaps the curvilinear line to an arc line that is concentric with the circle.

12. The computer-implemented method of claim 6, wherein:
the drawing aid tool comprises a protractor;
the first grip is located at a center point of the protractor;
the second grip is located on a circle, wherein a radius of the circle is defined by a distance between the first grip and the second grip;
the graphic representation comprises:
the circle having the first grip and the second grip; and
a ray between the first grip and the second grip;
the stroke gesture comprises a curvilinear line; and
the remapping remaps the curvilinear line to a ray that projects from the center point.

13. The computer-implemented method of claim 6, further comprising:
setting, on the drawing aid tool, a relative distance that is based on the second grip; and
displaying on the drawing aid tool, one or more increment lines that are based on the relative distance; and
wherein the defined stroke has a precise defined length that comprises a multiple of the relative distance.

14. The computer-implemented method of claim 6, further comprising:
setting, on the drawing aid tool, a relative distance that is based on the second grip;
displaying on the drawing aid tool, one or more increment lines that are based on the relative distance; and
defining a pressure release effect that is based on a finish distance between a last passed increment and an end of the stroke gesture.

15. The computer-implemented method of claim 6, wherein the defined stroke is displayed dynamically in real time as the stroke gesture is detected.

16. An apparatus for enabling a tool implement on a multi-touch computer system comprising:
(a) the multi-touch computer system having a processor;
(b) an application executing on the processor of the multi-touch computer system, wherein the application is configured to:
(i) detect a first touch at a border of a touch-sensitive region of the multi-touch device;
(ii) detect a second touch at the border of the touch-sensitive region of the multi-touch device;
(iii) if the second touch is detected within a threshold time, display the tool implement, wherein the tool implement comprises:
(1) a first grip located at the first touch;
(2) a second grip located at the second touch; and
(3) a graphic representation of the tool implement wherein a relationship between the first grip and the second grip defines a size and orientation of the tool implement;
(iv) detecting a tap gesture on the first grip or the second grip;
(v) in response to the tap gesture, cycling to a different drawing aid tool;
(vi) position the tool implement based on movement of the first touch and the second touch, wherein the positioning comprises moving the first grip and the second grip corresponding to the movement of the first touch and the second touch;
(vii) detect a touch gesture in the multi-touch device; and
(viii) utilize the tool implement in combination with the touch gesture to perform an operation in an application executing on the multi-touch device.

17. The apparatus of claim 16, wherein:
the tool implement comprises a drawing aid tool;
the touch gesture comprises a stroke gesture;
the application comprises a computer drawing application; and
the application is configured to utilize the tool implement by remapping the stroke gesture to a defined stroke using the drawing aid tool and displaying the defined stroke.

18. The apparatus of claim 16, wherein the application is further configured to:
detect a two-finger hold on the first grip and the second grip of the tool implement;
drag the tool implement towards the border of the touch sensitive region using the first grip and the second grip;
detect two outgoing touch events, of the first grip and the second grip, from the border; and
in response to detecting the two outgoing touch events, deactivate and stop displaying the tool implement.

19. The apparatus of claim 16, wherein the application is further configured to:
detect a touch event on a tool implement toggle button; and
in response to the detecting of the touch event, deactivate and stop displaying the tool implement.

20. The apparatus of claim 16, wherein the application is further configured to:
detect a two finger hold on the first grip and the second grip of the tool implement;
detect a dragging of the first grip and the second grip to a single point;
detect a colliding touch event of the first grip and the second grip at the single point; and
in response to the detecting of the colliding touch event, deactivate and stop displaying the tool implement.

21. An apparatus for drawing a stroke using a drawing aid tool on a multi-touch computer system comprising:
(a) the multi-touch computer system having a processor;
(b) an application executing on the processor of the multi-touch computer system, wherein the application is configured to:

(i) activate and display a drawing aid tool, wherein the drawing aid tool comprises:
  (1) a first grip located at a first touch in a touch-sensitive region of the multi-touch device;
  (2) a second grip located at a second touch in the touch-sensitive region of the multi-touch device; and
  (3) a graphic representation of the tool wherein a relationship between the first grip and the second grip defines a size and orientation of the drawing aid tool;
(ii) detecting a tap gesture on the first grip or the second grip;
(iii) in response to the tap gesture, cycling to a different drawing aid tool;
(iv) detect a stroke gesture in the multi-touch device;
(v) remap the stroke gesture to a defined stroke using the drawing aid tool; and
(vi) display the defined stroke.

22. The apparatus of claim 21, wherein the application is further configured to:
position the drawing aid tool based on movement of the first touch and the second touch, wherein the positioning comprises moving the first grip and the second grip corresponding to the movement of the first touch and the second touch.

23. The apparatus of claim 21, wherein:
the drawing aid tool influences a complete digital canvas space of the multi-touch device; and
the influence of the drawing aid tool is not specific to a drawing aid tool location.

24. The apparatus of claim 21, wherein:
the first touch and the second touch are controlled by a first hand of a user; and
the stroke gesture is controlled by a second hand of the user.

25. The apparatus of claim 21, wherein:
the drawing aid tool comprises a ruler;
the first grip is located at a first end of the ruler;
the second grip is located at a second end of the ruler;
the graphic representation comprises a ruler line connecting the first grip and the second grip;
the stroke gesture comprises a curvilinear line; and
the application is configured to remap by remapping the curvilinear line to a new line that is parallel to the ruler line.

26. The apparatus of claim 21, wherein:
the drawing aid tool comprises a compass;
the first grip is located at a center point of the compass;
the second grip is located on a circle, wherein a radius of the circle is defined by a distance between the first grip and the second grip;
the graphic representation comprises the circle having the first grip as the center point and the second grip on a perimeter of the circle;
the stroke gesture comprises a curvilinear line; and
the application is configured to remap by remapping the curvilinear line to an arc line that is concentric with the circle.

27. The apparatus of claim 21, wherein:
the drawing aid tool comprises a protractor;
the first grip is located at a center point of the protractor;
the second grip is located on a circle, wherein a radius of the circle is defined by a distance between the first grip and the second grip;
the graphic representation comprises:
  the circle having the first grip and the second grip; and
  a ray between the first grip and the second grip;
the stroke gesture comprises a curvilinear line; and
the application is configured to remap by remapping the curvilinear line to a ray that projects from the center point.

28. The apparatus of claim 21, wherein the application is further configured to:
set, on the drawing aid tool, a relative distance that is based on the second grip; and
display on the drawing aid tool, one or more increment lines that are based on the relative distance; and
wherein the defined stroke has a precise defined length that comprises a multiple of the relative distance.

29. The apparatus of claim 21, wherein the application is further configured to:
set, on the drawing aid tool, a relative distance that is based on the second grip;
display on the drawing aid tool, one or more increment lines that are based on the relative distance; and
define a pressure release effect that is based on a finish distance between a last passed increment and an end of the stroke gesture.

30. The apparatus of claim 21, wherein the defined stroke is displayed dynamically in real time as the stroke gesture is detected.

\* \* \* \* \*